United States Patent

Shigeyama et al.

(10) Patent No.: US 9,070,266 B2
(45) Date of Patent: Jun. 30, 2015

(54) OPERATION MANAGEMENT SUPPORT APPARATUS FOR POWER PLANT

(75) Inventors: Musashi Shigeyama, Yokohama (JP); Kazunobu Kurahashi, Yokohama (JP); Chihiro Ohba, Chuo-ku (JP); Akio Yamamoto, Machida (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 32 days.

(21) Appl. No.: 13/994,384

(22) PCT Filed: Dec. 12, 2011

(86) PCT No.: PCT/JP2011/078712
§ 371 (c)(1),
(2), (4) Date: Jun. 14, 2013

(87) PCT Pub. No.: WO2012/081554
PCT Pub. Date: Jun. 21, 2012

(65) Prior Publication Data
US 2013/0271287 A1    Oct. 17, 2013

(30) Foreign Application Priority Data
Dec. 15, 2010    (JP) .................................. 2010-279671

(51) Int. Cl.
*G08B 3/00*    (2006.01)
*G08B 23/00*    (2006.01)
(Continued)

(52) U.S. Cl.
CPC    *G08B 23/00* (2013.01); *G21D 3/04* (2013.01); *G05B 23/0267* (2013.01); *G21D 3/001* (2013.01); *G21D 3/008* (2013.01); *Y02E 30/40* (2013.01)

(58) Field of Classification Search
None
See application file for complete search history.

(56) References Cited

U.S. PATENT DOCUMENTS 5,305,426 A * 4/1994 Ushioda et al. ................. 706/52
5,311,562 A * 5/1994 Palusamy et al. ............. 376/215
(Continued)

FOREIGN PATENT DOCUMENTS

EP    1 727 009 A1    11/2006
GB    2 294 129 A     4/1996
(Continued)

OTHER PUBLICATIONS

Korean Office Action issued Jun. 26, 2014, in Korea Patent Application No. 10-2013-7016613.
(Continued)

*Primary Examiner* — Julie Lieu
(74) *Attorney, Agent, or Firm* — Oblon, McClelland, Maier & Neustadt, L.L.P.

(57) ABSTRACT

Provide an operation management support apparatus for power plant, supporting a maintenance work and preventing a user from violation of the operational safety programs, caused by a human error in case where a power plant temporarily deviates from LCO. The operation management support apparatus for power plant includes: an alarm device 12 that compares a plant data measuring by sensors 3a-3x installed in a nuclear power plant 2 with preset alarm the value and generates an alarm output instruction signal for instructing an alarm output in case of determining that the power plant is abnormal; an operational safety program DB 14 that stores an information in relation to an operational safety program of the power plant; an support device 13 that extracts an information in relation to the operational safety program of which the alarm output represents a conflict from the operational safety program DB 14 based on the plant data in relation to the alarm output in case of receiving the alarm output instruction signal; and a display device 15 (16) that displays the plant data and the information in relation to the operational safety program, extracted by the support device.

6 Claims, 10 Drawing Sheets

(51) Int. Cl.
*G08B 9/00* (2006.01)
*G05B 23/02* (2006.01)
*G21D 3/00* (2006.01)
*G21D 3/04* (2006.01)

(56) References Cited

U.S. PATENT DOCUMENTS

| | | | |
|---|---|---|---|
| 5,557,549 A * | 9/1996 | Chang | 702/183 |
| 6,091,790 A | 7/2000 | Ridolfo | |
| 6,236,699 B1 | 5/2001 | Ridolfo | |
| 6,421,405 B1 | 7/2002 | Ridolfo | |
| 2004/0260408 A1 * | 12/2004 | Scott et al. | 700/20 |
| 2006/0265182 A1 * | 11/2006 | Sato et al. | 702/179 |

FOREIGN PATENT DOCUMENTS

| | | |
|---|---|---|
| GB | 2 448 894 A | 11/2008 |
| JP | 6 150179 | 5/1994 |
| JP | 10-319180 | 12/1998 |
| JP | 2003 185782 | 7/2003 |
| JP | 2004 317273 | 11/2004 |
| JP | 2005 196340 | 7/2005 |
| JP | 2006-330774 | 12/2006 |
| JP | 2007 48025 | 2/2007 |
| JP | 2010 211377 | 9/2010 |

OTHER PUBLICATIONS

International Preliminary Report on Patentability issued Jun. 27, 2013 in Application No. PCT/JP2011/078712.

Written Opinion of the International Search Authority issued Jan. 10, 2012 in Application No. PCT/JP2011/078712.

Extended European Search Report issued Apr. 17, 2014 in Patent Application No. 11849732.0.

International Search Report Issued Jan. 10, 2012 in PCT/JP11/078712 Filed Dec. 12, 2011.

* cited by examiner

| ITEM | | LCO | |
|---|---|---|---|
| OO control device | | The element is operable | |
| CONDITION | REQUIRED ACTION | | AOT |
| A. Element X is inoperable | A1. Determine whether substitute element of the element X is operable.<br>AND<br>A2. Recover the element X to operable state. | | 1 HOUR AND THEN ONCE EVERY 8 HOURS DURING 3 DAYS |
| B. Element Y is inoperable | B1. Recover the element Y to operable state.<br>OR<br>B2. Decrease reactor thermal power. | | 8 HOURS<br><br>8 HOURS |
| C. Neither element X nor element Y is operable | C1. Recover the element X to operable state.<br>OR<br>C2. Recover the element Y to operable state. | | 1 HOUR<br><br>1 HOUR |
| D. Action required from the conditions A, B and C has been completed within the completion time | D1. Place hot shut down condition.<br>AND<br>D2. Place cold shut down condition. | | 24 HOURS<br><br>36 HOURS |

FIG. 10

OPERATION MANAGEMENT SUPPORT APPARATUS FOR POWER PLANT

TECHNICAL FIELD

The present invention relates to a support apparatus which manages operational state of power generating plant (power plant), and particularly to prevent from occurring human error during recovery work for being recovered from an operational state where a nuclear power plant deviates from ordained Limiting Conditions for Operation (LCO).

BACKGROUND ART

An electric utility, in case of operating the power plant, must ordain basic matters to be observed for the sake of operation safety, such as an operation, a maintenance, a management of fuels or the like, as operational safety program, and then observe the operational safety program. For example, for the purpose of sufficiently securing safe function by the operational safety program, a nuclear power generating utility ordains necessary matters such as the number of standby device, parameters such as temperature, pressure and the like, and so on. These necessary matters are referred to as "Limiting Conditions for Operation (LCO)".

In case of being confirmed that the nuclear power plant becomes a state which is not temporarily satisfied LCO by occurring that some devices or the likes which configure the nuclear power plant become non-compliant, the nuclear power generating utility states that the nuclear power plant now occurs LCO deviation, and tries to recover the devices so as to put an operable state from LCO deviation within predetermined time. In case of being difficult to recover from LCO deviation, it is obligated that the nuclear power generating utility acts countermeasure such as a reactor emergency shutdown.

Namely, a time required to be recovered by placing a state where the device being non-compliant can be operated is referred to as "allowed outage time (AOT)". In the operational safety program, AOT is ordained in each operational state of the nuclear reactor, each condition deviating from LCO, and each required action.

Currently, there is a case where the nuclear power generating utility finds that some devices become non-compliant based on alarm output, parameter variation, periodic patrol and inspection or the like. In this case, the utility takes actions such as collecting necessary information for checking and determining a situation of the nuclear power plant, checking against the operational safety program, determining whether LCO is deviated or not, checking an action (a countermeasure), notifying to relevant section, managing operation time for completing recovery from the non-compliant state within AOT or the like. The electronic utility needs management means for surely accomplishing the actions.

As a conventional technique, the technique which supports operation management of power generating facilities is disclosed in patent document 1. The operation management system includes means for weighting abnormal degree of the power generating facilities in stages based on operational state information and outputting correspondence information which is preset in each abnormal degree. The operation management system is a system which selects correspondent processing time and processing content from predetermined processing time and processing content, based on a degree of the malfunction occurred in the power generating facilities, when a malfunction occurs in the power generating facilities.

PRIOR ART DOCUMENT

Patent Document

Patent Document 1: Japanese Patent Laid-Open Publication No. 2002-6938

DESCRIPTION OF INVENTION

Problems to be solved by Invention

The operation management system disclosed in the Patent Document 1 determines in accordance with a degree of abnormality or malfunction. However, since the degree of abnormality or malfunction merely is weighted on the basis of processing means and processing content which are necessary for maintenance work (operation), the operation management system disclosed in the Patent Document 1 may be impossible to apply for operation management based on the operational safety program which specifically defines determination criteria, action (countermeasure) to be taken or AOT in each device which configures a plant.

Further, in operations of real nuclear power plant, after the nuclear power generating utility states that temporary LCO deviation is presently occurred in the nuclear power plant, AOT is verifying in accordance with means or progresses, of maintenance action. In conventional techniques, it is not assumed that a situation where AOT is verifying in accordance with means or progresses, of maintenance action happens. Therefore, these conventional techniques are impossible to solve the situation.

Currently, in the nuclear power plant, in case of being found out non-compliance of the operation, an action (a countermeasure) against the case is taken by human system such as a duty operator or the like. However, the countermeasure taken by the duty operation may be against the operational safety program, due to a human error, such as a faulty decision, an incomplete action or the like, of the duty operator.

Further, in case where an alarm output or parameter verification causes non-compliance, there may be a case being necessary to determine a portion where the non-compliance occurs and check contents of the non-compliance. In this case, determination based on experience of veteran operator is required.

Furthermore, for the purpose of accurately selecting and checking relevant article from a number of articles defined in the operational safety program, it is required that the operator memorizes contents described in the operational safety program.

As described above, at present, proper and quick action for being non-compliant of the plant operation largely depends on operation skill of operator.

Meanwhile, there is OnLine Maintenance (OLM) during the operational state or long-term cycle operation. The OLM or the long-term cycle operation is non-negligible as recent movement surrounding the nuclear power and progresses to consider introduction in earnest. Aftertime, by introducing these technologies, because it is pointed out a possibility of enlarging application range of the maintenance work which utilizes AOT, it is required that the application range of the maintenance work which utilizes AOT is accurately enlarged.

The present invention has been made in view of the above-described circumstances. An object of the present invention is to provide an operation management support apparatus for power plant which supports maintenance work (operation) and prevents the power plant from becoming a state against the operational safety program, caused by human error.

Means for Solving Problem

The operation management support apparatus according to the present invention, in view of the above-described circumstances, includes: an alarm device that compares a plant data measuring by a sensor installed in a power plant with preset alarm the value and generates an alarm output instruction signal for instructing an alarm output in case of determining that the power plant is abnormal; an operational safety program storage that stores an information in relation to an operational safety program of the power plant; an operational safety program extraction device that extracts an information in relation to the operational safety program of which the alarm output represents a conflict from the operational safety program storage on the basis of the plant data in relation to the alarm output in case of receiving the alarm output instruction signal; and a display device that displays the plant data and the information in relation to the operational safety program, extracted by the operational safety program extraction device.

Effect of Invention

According to the present invention, in case of being found out non-compliance of the plant operation, a risk being against the operational safety program, caused by human error can be reduced.

BRIEF DESCRIPTION OF THE DRAWINGS

In the accompanying drawings:

FIG. 10 is an illustration illustrating an example of LCO, conditions with respect to deviating from LCO, and action and AOT in each of the conditions.

EMBODIMENT FOR CARRYING OUT THE INVENTION

The embodiments of the operation management support apparatus for power generation plant according to the present invention will be described with reference to the accompanying drawings. In this embodiment, an operation management support apparatus for supporting an operation management of a nuclear power plant will be described as an example.

Figure 1:
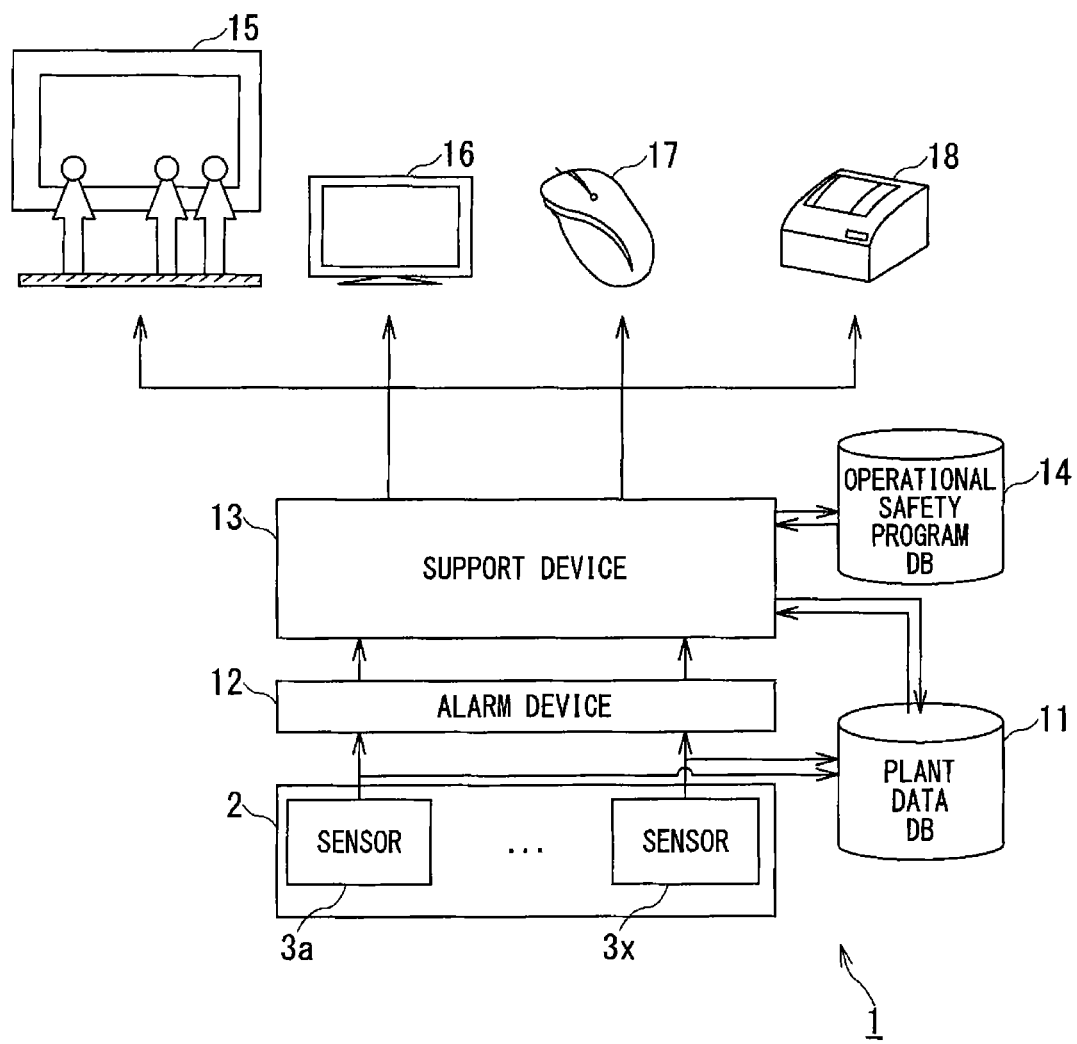
FIG. 1 is a schematic diagram explaining a signal flow in an embodiment of an operation management support apparatus according to the present invention.

FIG. 1 is a schematic diagram explaining a signal flow in the operation management support apparatus 1 which is an example of the operation management support apparatus for power generation plant according to the present invention.

The operation management support apparatus 1 is configured by including a plant data database (DB) 11, an alarm device 12, a support device 13, an operational safety program database (DB) 14, and each kind of man-machine device 15-18.

The plant data DB 11 stores predetermined plant data measured by sensors $3a$-$3x$ installed in a nuclear power plant 2. The plant data measured by sensors $3a$-$3x$ are transmitted to the support device 13 through the alarm device 12.

The alarm device 12 determines whether there is an abnormal state or not in the nuclear power plant 2 by comparing the plant data input (transmitted) from the sensors $3a$-$3x$ with each alarm threshold value which is preset. If the alarm device 12 determines that there is the abnormal state in the nuclear power plant 2 based on comparison result, the alarm device 12 generates an alarm output instruction signal for allowing to output the alarm, and transmits the alarm output instruction signal to the support device 13.

After the support device 13 receives the alarm output instruction signal from the alarm device 12, the support device 13 extracts (lists) plant data predicted as cause of the alarm output, i.e., plant data being related to the alarm output from the plant data DB 11, and transmits the plant data to the individual display device 16 so as to be displayed on the individual display device 16. After the support device 13 receives instruction for displaying list of plant data displayed on the individual display device 16 through the input device 17, the support device 13 extracts details of correspondent plant data from the plant data DB 11 and transmits the details to the large display device 15 and the individual display device 16.

The support device 13 considers the plant data and thereby lists article which is estimated to be against the operational safety program from the operational safety program DB 14. The listed article is transmitted from to the individual display device 16 so as to be displayed on the individual display device 16. The support device 13 receives selection of the operational safety program displayed on the individual display device 16. And then, if manager as a person in charge, defined in the operational safety program, performs predetermined operation on the basis of authentication by the person, the support device 13 receives declaration of LCO deviation.

The operational safety program DB 14 stores the operational safety program of the nuclear power plant 2 and an information in relation to required action defined in the operational safety program.

The display devices 15 and 16 display various information such as plant data, article of the operational safety program, action required from the operational safety program, allowed outage time (AOT), maintenance work history from the alarm output to recovery completion and the like. The large display device 15 includes a screen which is larger than that of the individual display device 16. The individual display device 16 is, for example, a liquid crystal display, and includes a screen so that each user can individually use.

The input device 17 is a device such as a mouse, a keyboard or the like, and is used when the operator (the human) instructs to the operation management support apparatus 1. The printer 18 prints out an information being similar to an information displayed on the display devices 15 and 16.

Next, specific configuration and function, of the operation management support apparatus 1 will be described.

Figure 2:
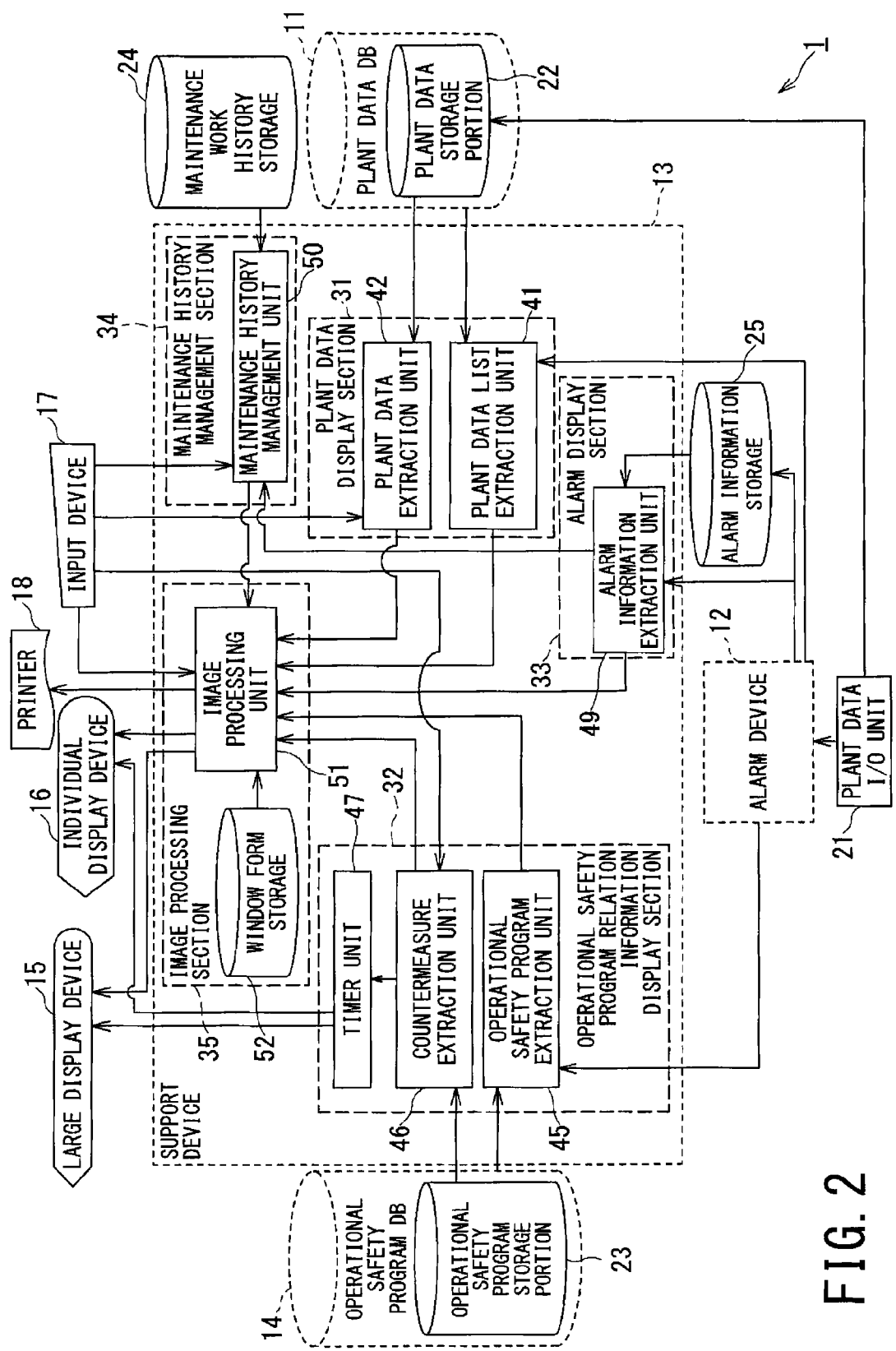
FIG. 2 is a function block diagram of the embodiment of the operation management support apparatus according to the present invention.

FIG. 2 is a function block diagram of the operation management support apparatus 1 described in the embodiment.

The plant data input/output (I/O) unit 21 inputs and outputs the plant data measured by the sensors 3a-3x.

The plant data DB 11 includes a plant data storage portion 22. The plant data storage portion 22 stores the plant data transmitted from the plant data I/O unit 21 in own storage region. The plant data DB 11 provides plant data list hereinafter described in accordance with a request transmitted from the plant data list extraction unit 41.

The operational safety program DB 14 includes an operational safety program storage portion 23. The operational safety program storage portion 23 stores an information being relevant to a limiting condition for operation, a condition so that the operational safety program is applied, a required action and an allowed outage time, in each article of the operational safety program in own storage region. Further, the operational safety program DB 14 provides operational safety program selection window hereinafter described in accordance with a request transmitted from the operational safety program extraction unit 45.

The maintenance work history storage 24 stores maintenance work content, occurrence time and completion time, in each maintenance work. The alarm information storage 25 stores a name of output alarm and a time of the alarm output in own storage region.

The support device 13 includes a plant data display section 31 and an operational safety program relation information display section 32, as components for providing main functions. The support device 13 further includes an alarm display section 33, a maintenance history management section 34 and an image processing section 35, as components for providing peripheral functions.

The plant data display section 31 includes a plant data list extraction unit 41 and a plant data extraction unit 42.

After the plant data list extraction unit 41 receives the alarm output instruction signal from the alarm device 12, the plant data list extraction unit 41 extracts plant data list which are predicted as cause of being output the alarm output instruction signal from the plant data DB 11 on the basis of the alarm, and then transmits the plant data list to an image processing unit 51.

The plant data extraction unit 42 extracts plant data required to display via the input device 17 from the plant data storage portion 22 and transmits the plant data to the image processing unit 51.

The operational safety program relevant information display section 32 includes an operational safety program extraction unit 45, a countermeasure extraction unit 46 and a timer unit 47.

If the operational safety program extraction unit 45 receives the alarm output instruction signal from the alarm device 12, the operational safety program extraction unit 45 extracts list of the operational safety program article which may be against the operational safety program and transmits the list to the image processing unit 51. When the operational safety program extraction unit 45 extracts the operational safety program article, the operational safety program extraction unit 45 can determine the operational safety program article to be extracted by associating an event which causes the alarm with the operational safety program article and so on.

The countermeasure extraction unit 46 extracts an action (a countermeasure), corresponding to the operational safety program article selected from the input device 17 and an information related to AOT, from the operational safety program storage portion 23. The countermeasure and the information related to AOT are transmitted from the countermeasure extraction unit 46 to the image processing unit 51. The information related to AOT is also transmitted from the countermeasure extraction unit 46 to the timer unit 47.

When the timer unit 47 receives the information related to AOT from the countermeasure extraction unit 46, the timer unit 47 starts to time and transmits time information to the large display device 15 or the individual display device 16 so that the display device 15 or 16 can display the time information with the information related to AOT.

The alarm display section 33 includes an alarm information extraction unit 49. After the alarm information extraction unit 49 receives the alarm output instruction signal from the alarm device 12, the alarm information extraction unit 49 transmits alarm information including an alarm name and an alarm time to the image processing unit 51 and the maintenance history management unit 50.

The maintenance history management section 34 includes the maintenance history management unit 50. The maintenance history management unit 50 transmits the alarm information received from the alarm information extraction unit 49 and an information input from the input device 17 to the image processing unit 51. Here, the information input from the input device 17 is the maintenance work content, occurrence time and completion time, in each maintenance work. The maintenance history management unit 50 also stores the information input from the input device 17 in the maintenance work history storage 24.

The image processing section 35 includes the image processing unit 51 and a window form storage 52. While the image processing unit 51 receives the information from the operational safety program extraction unit 45, the countermeasure extraction unit 46, the alarm information extraction 49, the plant data list extraction unit 41, the plant data extraction unit 42 and the maintenance history management unit 50, the image processing unit 51 extracts necessary window form, in accordance with the information received in the image processing unit 51, from the window form storage 52. The image processing unit 51 generates display window information based on the information received from the operational safety program extraction unit 45 and the window form extracted from the window form storage 52, and transmits the display window information to the individual display device 16 (large display device 15). The window form storage 52 stores window form for displaying on the individual display device 16 (large display device 15) and transmits the image form required from the image processing unit 51 to the image processing unit 51.

Next, operations of the operation management support apparatus 1 will be described.

Figure 3:
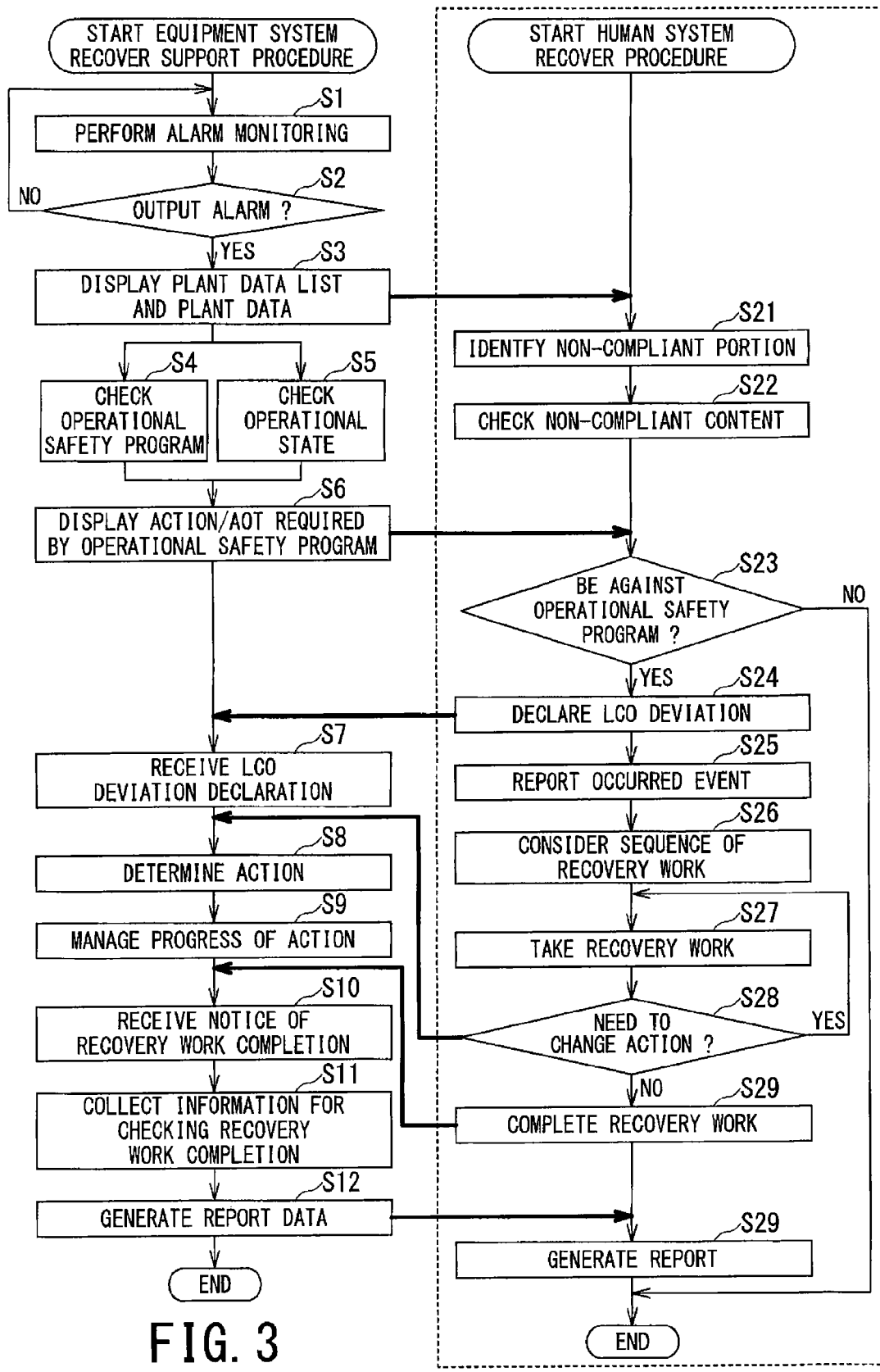
FIG. 3 is a flowchart explaining a flow of a recovery support procedure when the embodiment of the operation management support apparatus according to the present invention activates an alarm.

FIG. 3 is a chart explaining a flow of a recovery support procedure when the embodiment of the operation management support apparatus according to the present invention activates an alarm.

Namely, in FIG. 3, with procedure flow of the operation management support apparatus 1 (equipment system), a recovery procedure of human system acted by human such as operator or the like is illustrated in region enclosed by dashed line. In FIG. 3, the actor of each step illustrated in FIG. 3 is the support device 13, is not illustrated in a state being possible to distinguish various sections (functions) of the support device 13.

In the alarm monitoring step S1, the support device 13 monitors an alarm. In the alarm output determination step S2, the support device 13 determines whether the alarm is or not output. That is, the support device 13 determines whether the alarm output instruction signal is or not generated. In case of being determined that the alarm is not output, while the procedure goes back to the alarm monitoring step S1, the support device 13 continues to monitor the alarm in the step S1. In case of being determined that the alarm is output in the alarm output determination step S2, the procedure proceeds (goes) to the data presentation (display) step S3.

In the data display step S3, the support device 13 displays a plant data list display window and a plant data display window on the screen of the individual display device 16.

Figure 4:
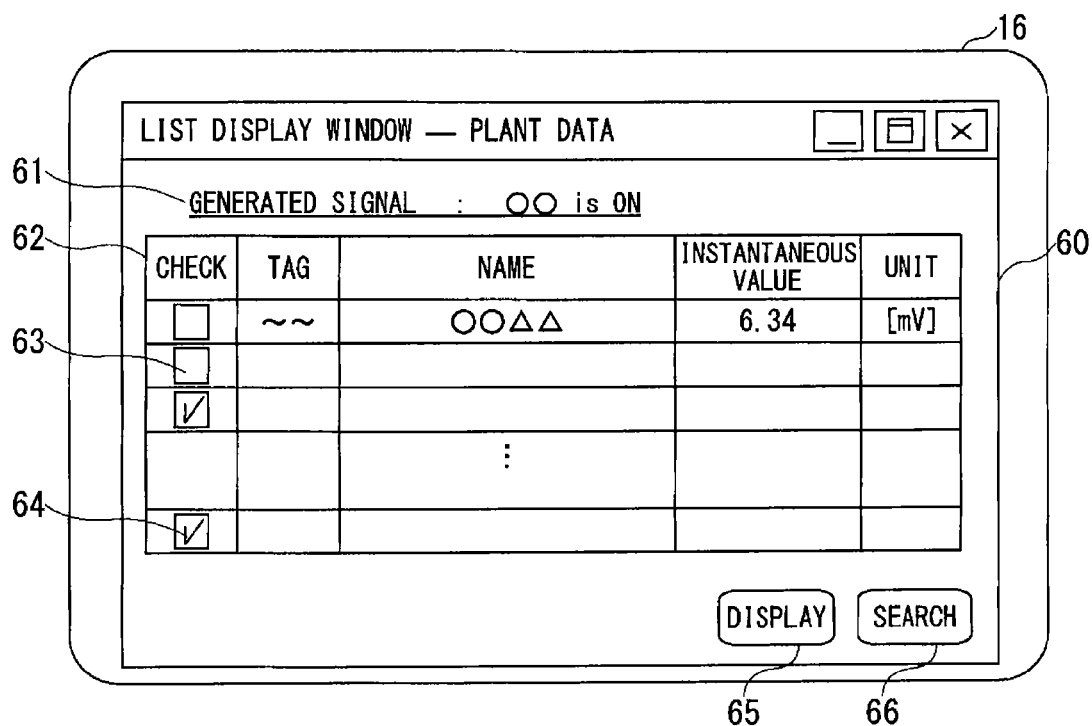
FIG. 4 is an explanation diagram explaining a configuration example of a plant data list display window.

FIG. 4 is an explanation diagram explaining a configuration example of the plant data list display window 60.

The plant data list display window 60 includes an alarm name display portion 61 which displays a name of alarm (signal) output from the alarm device 12 and a plant data table portion 62 which describes TAG NO., the plant data name, instantaneous value (real-time measurement value) and section, of listed plant data. The plant data list display window 60 also includes a data selection check box 63 which allows the operator to select the plant data. If the plant data is selected by the operator, in the data selection check box 63, a check mark (tick) 64 is displayed.

Further, in the plant data list display window 60 a display button 65 and a search button 66 are provided. The display button 65 receives instruct for displaying time series graph of the plant data selected by the operator and marked in the data selection check box 63.

The search button 66 receives instruction for displaying the plant data search window which is used for searching (extracting) the plant data.

Figure 5:
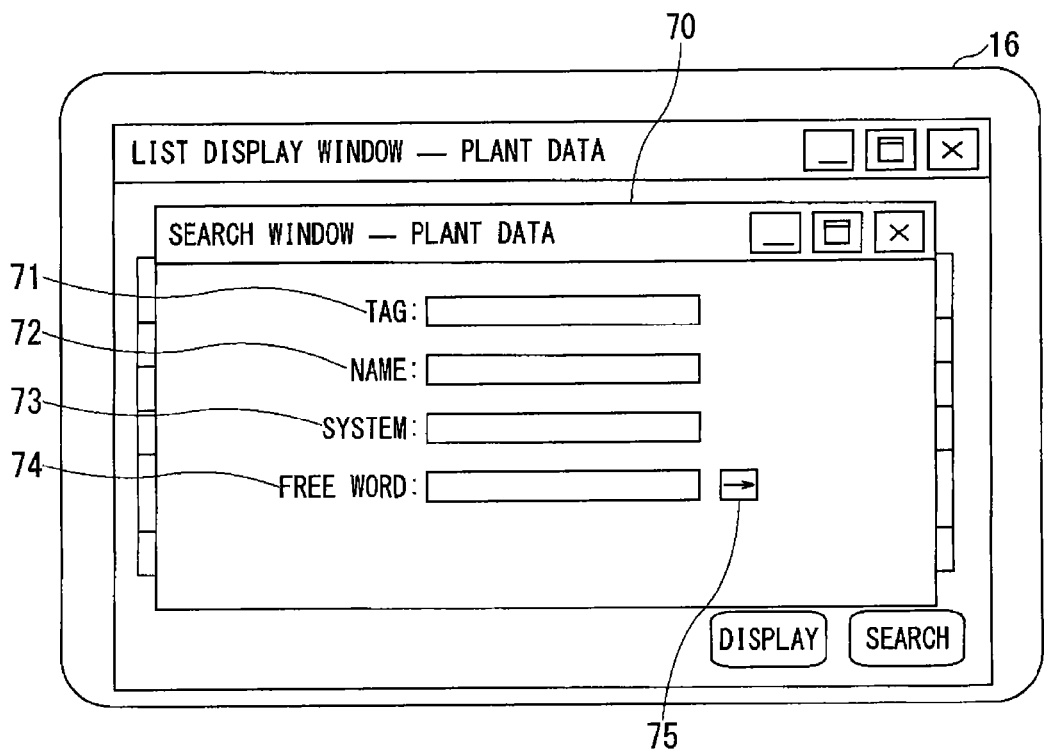
FIG. 5 is an explanation diagram explaining a configuration example of a plant data search window.

FIG. 5 is an explanation diagram explaining a configuration example of the plant data search window 70.

The plant data search window 70 includes a TAG input region 71 for searching arbitrary plant data by using TAG NO., a name input region 72 for searching arbitrary plant data by using plant data name, a system input region 73 for searching arbitrary plant data by using system name and a free keyword input region 74 for searching arbitrary plant data by using free keyword. The plant data search window 70 also includes search execution button 75 for receiving instruction of search (extraction) execution.

In case of being clicked (pushed) the search button 66 of the plant data list display window 60 (FIG. 4), the support device 13 allows the individual display device 16 to display the plant data search window 70 (FIG. 5). The support device 13 receives input obtained by inputting the search keyword or the free keyword in the input regions 71, 72, 73 or 74 arbitrarily selected from TAG NO., the plant data name, the system, and the free keyword, and instruction obtained by pushing the search execution button 75. The support device 13 allows the individual display device 16 to display search (extraction) result in same display format as the display format of the plant data list display window 60 (FIG. 4).

Incidentally, the function for searching the plant data in the plant data list display window 60, i.e., the search button 66 may be abbreviated.

In case of being pushed the display button 65 of the plant data list display window 60 (FIG. 4), the support device 13 generates time series graph of the plant data selected by checking the data selection check box 63 from the plant data stored in the plant data storage portion 22, and transmits the time series graph of the plant data to the individual display device 16 so as to be displayed on the individual display device 16. The operator acts the non-compliant portion determination step S21 and the non-compliant content checking step S22, of the nuclear power plant 2.

Figure 6:
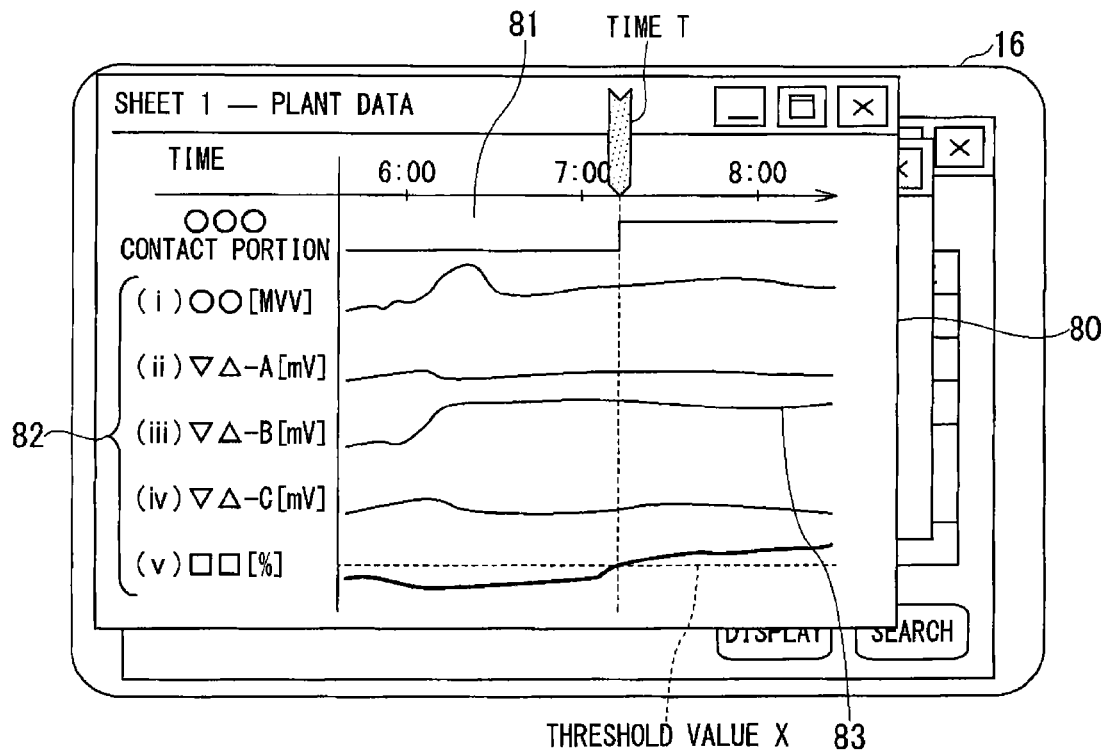
FIG. 6 is an explanation diagram explaining a configuration example of a plant data display window illustrating a time series graph of a plant data.

FIG. 6 is an explanation diagram explaining a configuration example of the plant data display window 80 illustrating a time series graph of a plant data.

The plant data display window 80 includes a time series graph display region 81 which displays the time series graph of the plant data selected in the plant data list display window 60, a plant data name display region 82 which displays the name of the plant data as the time series graph displayed in the time series graph display region 81, and a time series plot 83.

In the plant data display window 80 in FIG. 6, the time series graphs of "○○○ contact point", "(i) ○○ mega watt [MW]", "(ii) $\Delta\nabla$-A millivolt [mV]", "(iii) $\Delta\nabla$-B [mV]", "(iv) $\Delta\nabla$-C [mV]", and "(v) □□ [%]" are respectively displayed. Here, "○○○ contact point" is a contact point that generates contact signal. "(i) ○○ mega watt [MW]" is nuclear power plant thermal output signal. "(ii) $\Delta\nabla$-A millivolt [mV]", "(iii) $\Delta\nabla$-B [mV]" and "(iv) $\Delta\nabla$-C [mV]" are output signals output from same kind devices in each system A, B and C which are different each others. "(v) □□ [%]" is output signal output from another sensor.

In consideration of the plant data (ii), (iii) and (iv), the output signal of the plant data of which variation can be found by the operator is only the output signal "(iii) $\Delta\nabla$-B [mV]". Further, the operator can find variation of the output signal "(ii) $\Delta\nabla$-A millivolt [mV]" and "(iv) $\Delta\nabla$-C [mV]" in a period after the output signal "(iii) $\Delta\nabla$-B [mV]" starts to vary. And then, eventually, the operator can determine that the alarm output by exceeding the threshold value X of the output signal "(v) □□[%]" at the time T and thereby switching the signal of "○○○ contact point" on "ON". That is, the operator can determine that output increase of the device $\Delta\nabla$ installed in the B system is a cause of the alarm output.

It is noted that the method specifying the non-compliant portion and the non-compliant content which are explained in FIG. 6 is one of simple example and not limited the example in real operation.

In the operational safety program checking step S4, the support device 13 checks the operational safety program stored in the operational safety program DB 14. In the operational state checking step S5 in parallel with the operational safety program checking step S4, the support device 13 checks the operational state of the nuclear power plant 2.

In the required action/AOT presentation (display) step S6, in consideration of the operational safety program checked in the operational safety program checking step S4 and the operational state checked in the operational state checking step S5, the support device 13 provides the operator with the operational safety program article which may be against the operational safety program by being displayed on the display device 15 and/or 16.

Figure 7:
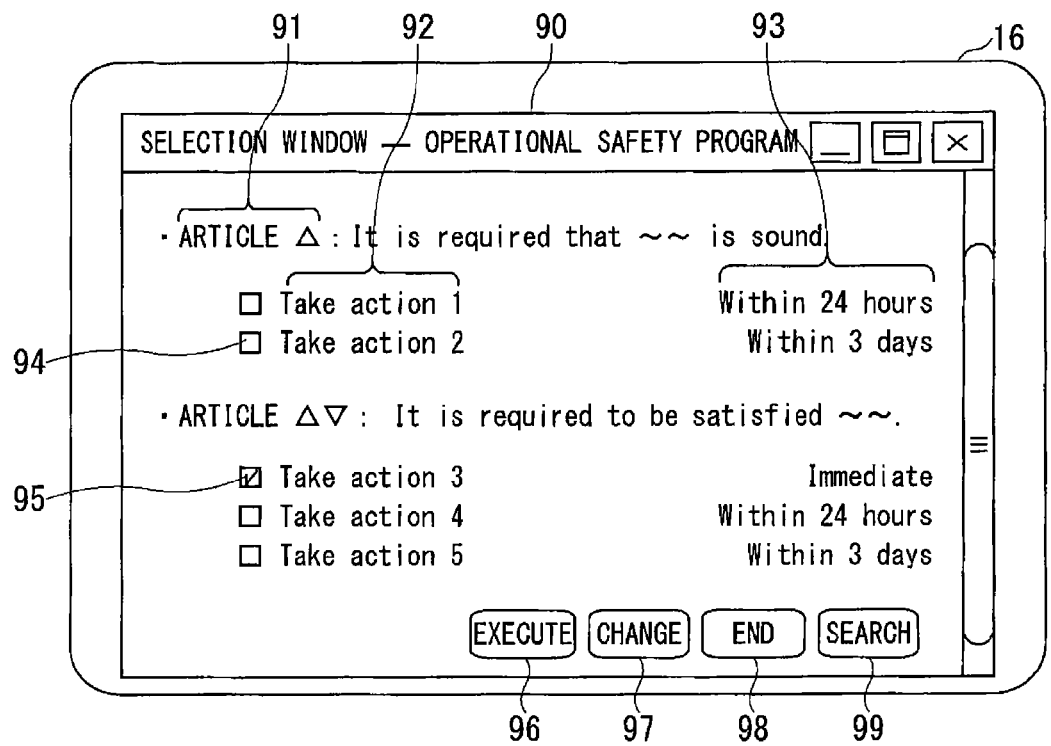
FIG. 7 is an explanation diagram explaining a configuration example of an operational safety program selection window.

FIG. 7 is an explanation diagram explaining a configuration example of the operational safety program selection window 90.

In the operational safety program selection window 90, an article 91 of the operational safety program listed by the support device 13, an action 92 required from the operational safety program and AOT 93 defined in the operational safety program are displayed. The operational safety program selection window 90 also includes a program selection check box 94 which allows the operator to select the action 92. If the plant data is selected by the operator, in the program selection check box 94, a check mark (tick) 95 is displayed.

In the operational safety program selection window 90, an execute button 96, a change button 97, an end button 98 and a search button 99 are provided.

The execute button 96 receives instruction for declaring "LCO deviation" in relation to the ordained article which is selected because of determining that there is a conflict with the operational safety program. The change button 97, based on the operator's determination, receives instruction for changing the action 92 of the ordained article which has already declared. The end button 98 receives instruction for executing a recovery action ending (completion) procedure. The search button 99 receives instruction for display an operational safety program search window.

Figure 8:
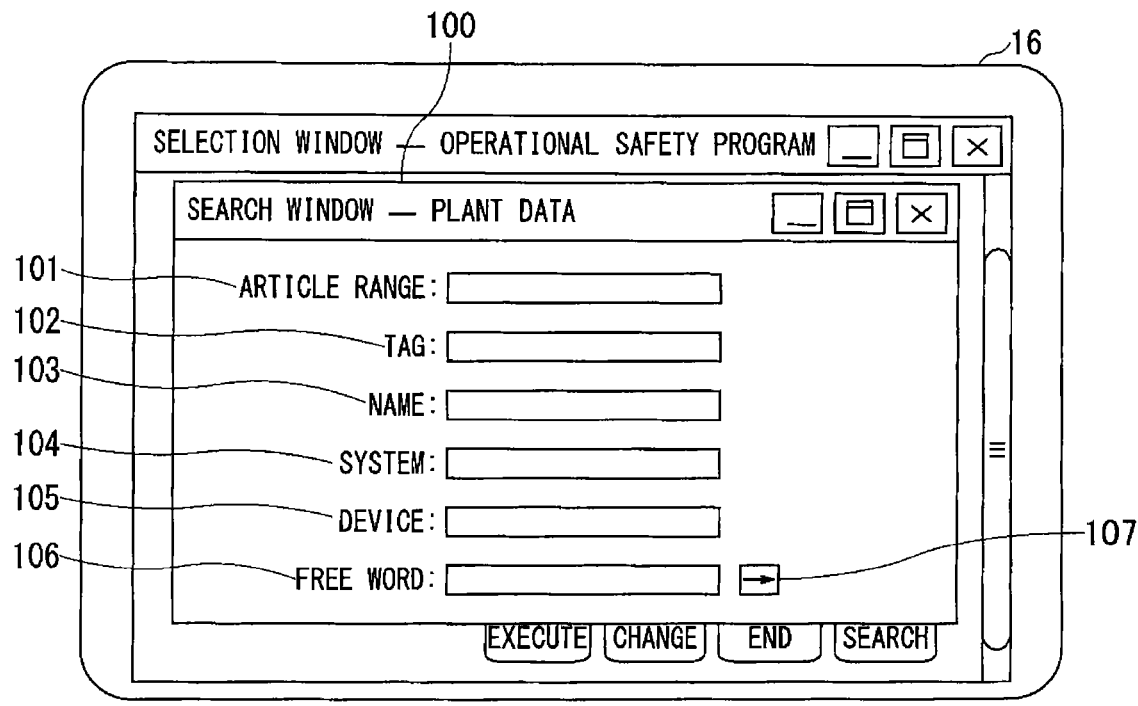
FIG. 8 is an explanation diagram explaining a configuration example of an operational safety program search window.

FIG. 8 is an explanation diagram explaining a configuration example of the operational safety program search window 100.

The operational safety program search window 100 includes a range specification region 101 for specifying a range of searching the article, a TAG input region 102 for searching arbitrary ordained article by using TAG NO., a name input region 103 for searching arbitrary ordained article by using a name of the plant device (which is, for example, recirculation pump, main steam isolation valve or the like), a system input region 104 for searching arbitrary ordained article by using system name, a device kind input region 105 for searching arbitrary ordained article by using a device kind name (which is, for example, pump or valve) and a free keyword input region 106 for searching arbitrary ordained article by using free keyword. The operational safety program search window 100 also includes a search execution button 107 for receiving instruction of search (extraction) execution.

If the support device 13 receives instruction for executing to search (extract) by pushing the search button 99 in the operational safety program selection window 90 (FIG. 7), the support device 13 allows the individual display device 16 to display the operational safety program search window 100 (FIG. 8). The support device 13 receives input of information such as range specification, TAG NO., device name or the like, and instruction obtained by pushing the search execution button 107. The support device 13 allows the individual display device 16 to display search (extraction) result in same display format as the display format of the operational safety program selection window 90 (FIG. 7).

Namely, the search function of the operational safety program selection window 90, i.e., the search button 99 may be abbreviated.

In the conflict determination step S23, based on the non-compliant portion and the non-compliant content checked in the steps S21 and S22, the operator determines whether current situation conflicts with the article of the operational safety program or not. In case where the operator determines whether current situation does not conflict with the article of the operational safety program, the operator ends the recovery procedure. As with the operator, the operation management support apparatus 1 also ends the recovery support procedure.

Meanwhile, in case where the operator determines whether current situation conflicts with the article of the operational safety program, in the LCO deviation declaration step S24, the operator selects the article and the action 92 which may conflict with the operational safety program from the article and the action 92 displayed on the operational safety program selection window 90 (FIG. 7). In this time, the operator subjects the safety program selection window 90 to display the check mark 95 by checking the program selection check box 94 of the article 91 and thereby declares LCO deviation to the operation management support apparatus 1.

Here, the person in charge who has authority to declare LCO deviation is defined in the operational safety program in each non-compliant portion and non-compliant content. Therefore, in case where LCO deviation is declared, for the sake of preventing the person who has no authority to declare LCO deviation from operating without permission by the person in charge, the support device 13 may has the function, of confirming that the person who tries to declare LCO deviation has the authority defined in the operational safety program, such as password authentication function or the like.

In the event report step S25, the operator reports required event occurred in the nuclear power plant 2 in a predetermined manner.

Meanwhile, in the LCO deviation declaration reception step S7, after the support device 13 receives instruction for checking the program selection check box 94, the support device 13 receives declaration of LCO deviation by receiving pushing operation of the execute button 96 in the operational safety program selection window 90 (FIG. 7).

In the action determination step S8, the support device 13, based on the action 92 to be taken which is selected (checked) in the program selection check box 94, determinates the action to be taken which is required from the operational safety program.

In the recovery sequence consideration step S26, the operator considers a recovery sequence for taking (proceeding) action to be taken. In the recovery work execution step S27, the operator executes (acts) recovery work by taking the action.

Here, upon proceeding the recovery work, the operator may need to change the action now being taken due to causing some reasons. In the change determination step S28, the operator determines whether it is necessary to change the action now being taken or not. In case where the operator determines to be necessary to change the action to be taken, the operator changes selection of the action 92 by changing a place checked in the program selection check box 94 displayed on the operational safety program selection window 90 (FIG. 7) and pushes down the change button 97. Then, the operator performs (acts) the recovery sequence consideration step S26 and the recovery work execution step S27. A procedure executed by the operator in the change determination step S28 will be described later.

The support device 13 which receives operation for pushing the change button 97 changes the action which has already determined in the action determination step S8 and is now being taken, and again determines new action to be taken after changing the action now being taken.

In the situation management step S9, the support device 13 manages AOT, history of recovery work acted by the operator, actual state of recovery work acted by the operator, or the like by means of the maintenance work management window displayed on the large display device 15.

Figure 9:
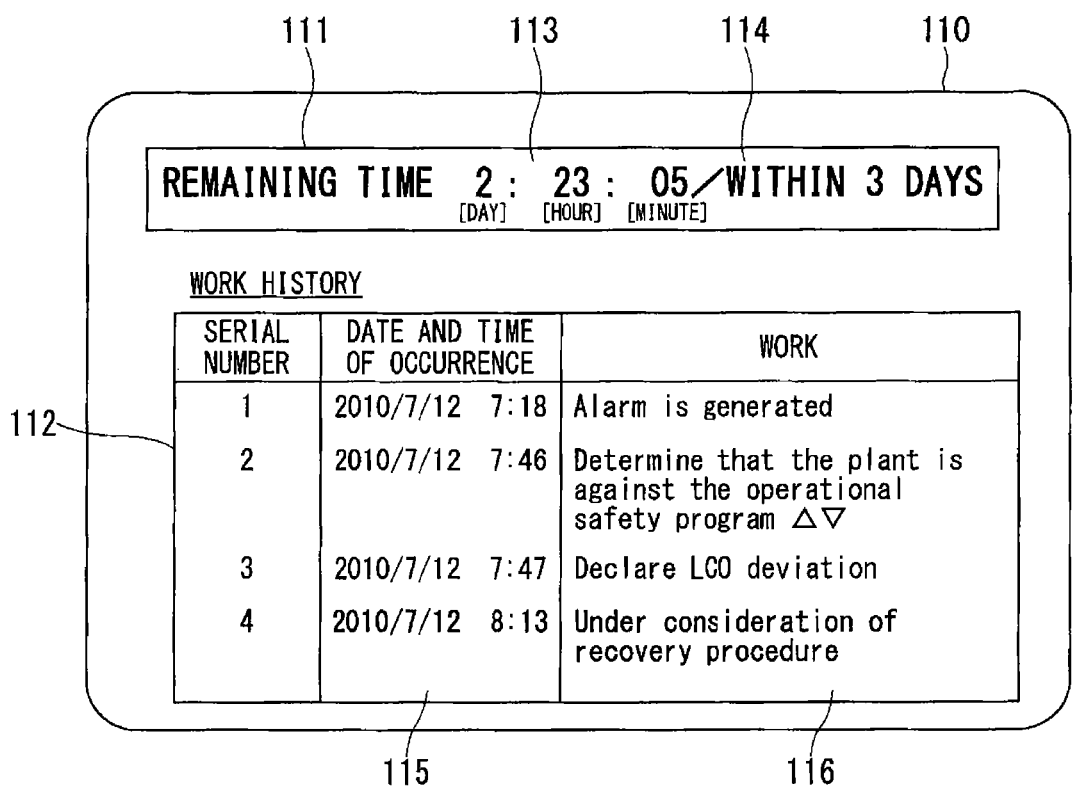
FIG. 9 is an explanation diagram explaining a configuration example of a maintenance work management window.

FIG. 9 is an explanation diagram explaining a configuration example of the maintenance work management window 110.

The maintenance work management window 110 includes an AOT management region 111 which displays information for the purpose of managing AOT on the large display device 15, and a work history management region 112 which displays information for the purpose of managing maintenance work on the large display device 15.

The AOT management region 111 includes a region for displaying the AOT remaining time 113 and the AOT 114. The history management region 112 includes a work occurrence time display portion 115 which displays an occurrence time of main work of the maintenance work performed until recovery completion from alarm occurrence and a work history display portion 116 which displays contents of the maintenance work. Incidentally, the support device 13 may display the maintenance work management window 110 on the individual display device 16.

In the operation completion step S29, in case where the operator has finished recovery work, the operator pushes down the end button 98 in the operational safety program selection window 90 (FIG. 7) through the input device 17.

On the contrary, after the operator pushes down the end button 98, the support device 13, receives an information of completing the recovery action in the step S10. Subsequently, in the information collection step S11, the support device 13 obtains a determination information for being possible to determine whether the recovery action has completed. The determination information is, for example, a plant data selected by the operator in the non-compliant portion determination step S21 and the non-compliant content checking step S22. A way determining whether the recovery action has completed, for example, is determining whether the parameter value becomes a normal (sound) level and then is stably maintained in the normal level and so on.

In the report data creation step S12, for the sake of supporting report writing (generating) as work of the operator, the support device 13 obtains hardcopy of the recovery work history or the plant data display window 80 by printing out the recovery work history or the plant data display window 80, or the like. Based on the hardcopy or the like, the operator generates required report in a report generation step S30.

Next, specific procedure in case where the determination step S28 occurs will be described.

FIG. 10 is an illustration illustrating an example of LCO, conditions with respect to deviating from LCO, and action and AOT in each of the conditions.

The example of LCO explained in the specification and drawings is required that "in ○○ control device, the element can be operated". There are conditions A to D which are not satisfied the exemplified LCO. The condition A is that "Case where element X is inoperable". The condition B is that "Case where element Y is inoperable". The condition C is that "Case where neither element X nor element Y is operable (both element X and element Y are inoperable)". The condition D is that "Case where action required from the conditions A, B and C has not completed (finished) within the completion time (within AOT)". Required action and AOT, of the each condition A to D are illustrated in FIG. 10.

Figure 11A:
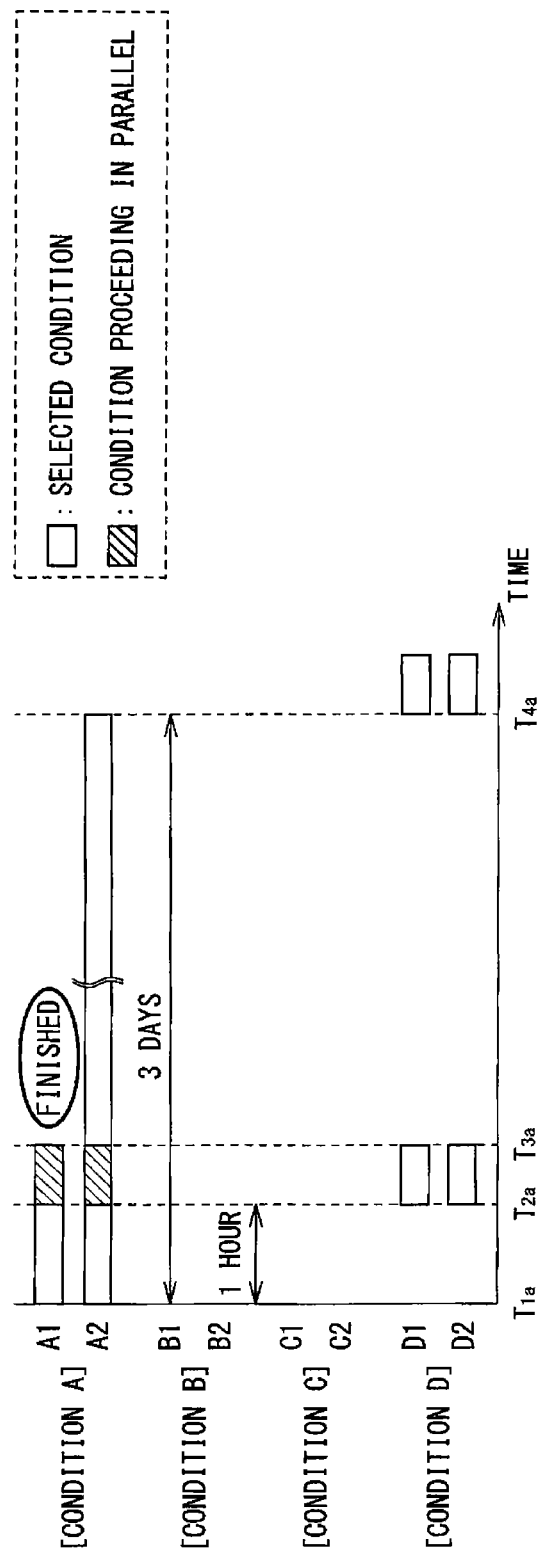
FIG. 11 is an illustration explaining an application pattern of required action in case where LCO is not satisfied.
Figure 11B:
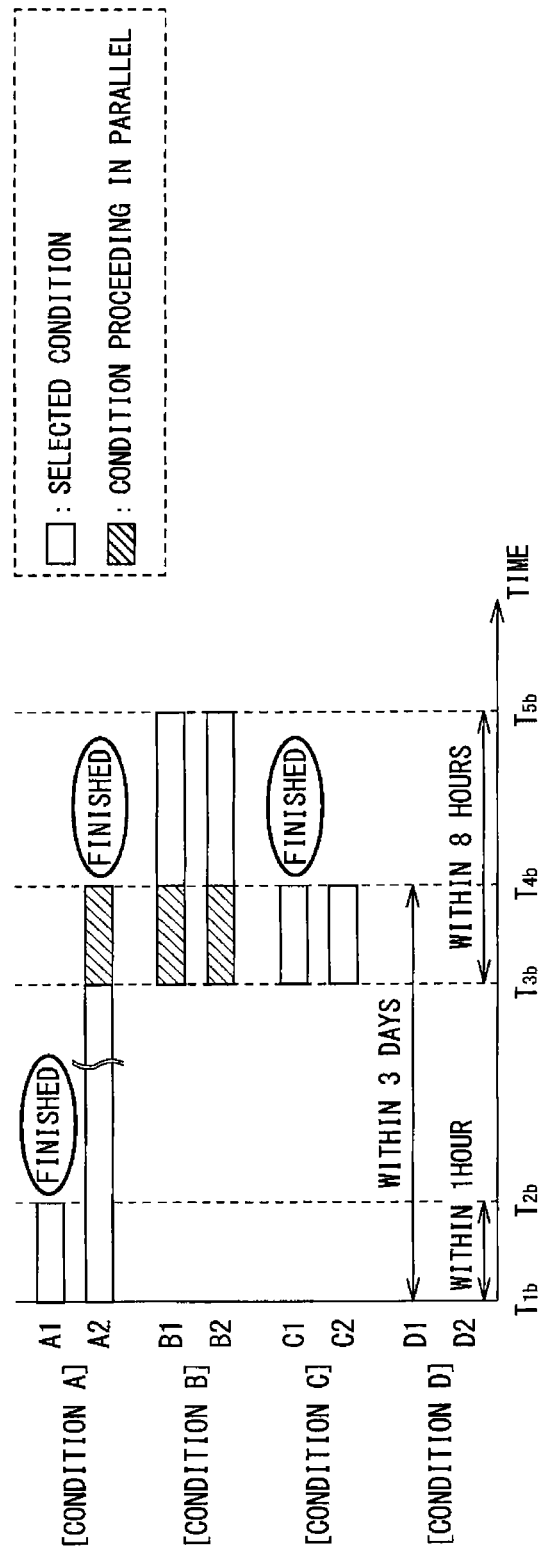
Figure 11C:
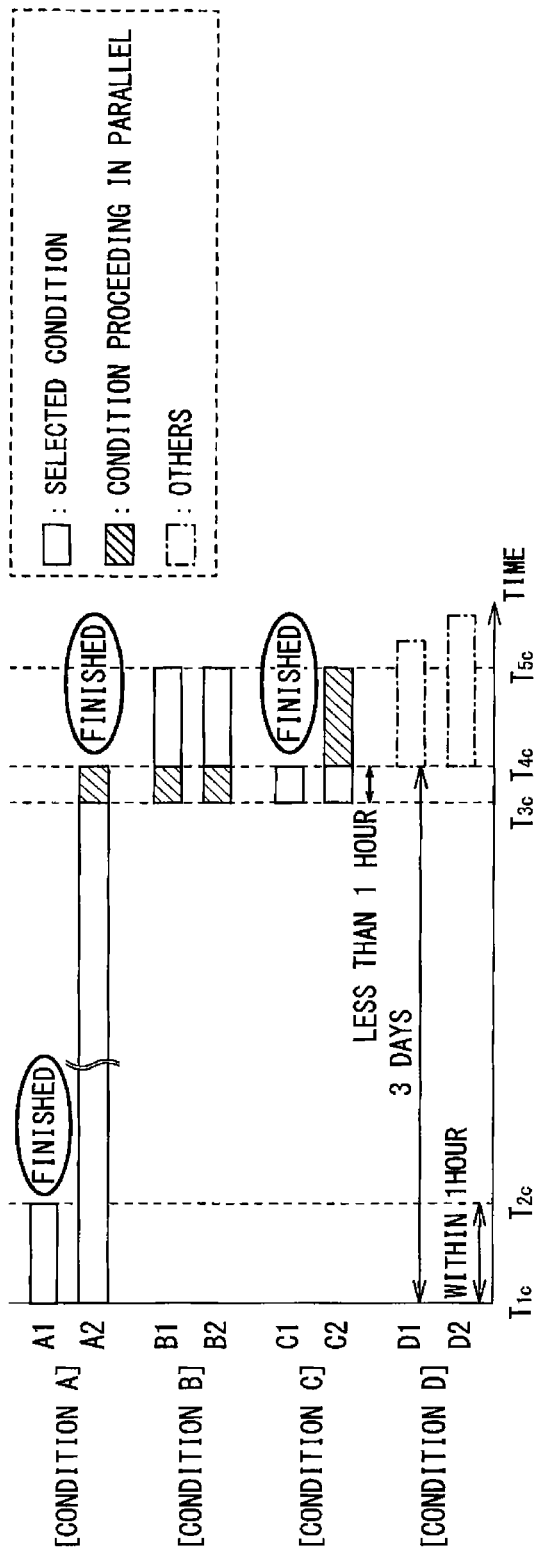

FIG. 11 (including FIGS. 11A, 11B and 11C) is an illustration explaining an application pattern of required action in case where LCO is not satisfied.

FIG. 11A illustrates an example of the case where one element (herein, the element X) is inoperable. FIG. 11B illustrates an example of the case where another element (herein, the element Y) is inoperable. FIG. 11C illustrates an example of the case where, in the application pattern illustrated in FIG. 11B, AOT of the "condition A" (here, the case where one element (the element X) is inoperable) has finished before AOT of the "condition C" (here, the case where neither element X nor element Y is operable) has finished.

There are three work (operation) flows from the time when it is determined that a plant temporally deviates ordained LCO to the time when the action for recovering from the LCO deviation completes (finishes). The three work (operation) flows which respectively correspond to the three application patterns respectively illustrated in FIGS. 11A, 11B and 11C will be described. Incidentally, although the article of the operational safety program, the change of the action or the termination of the operation will be mentioned later, in actual, the change of the action or the termination of the operation is performed by pushing the change button 97 or the end button 98, in the operational safety program selection window 90 (FIG. 7).

A case where one element (element X) cannot be operated and is illustrated in FIG. 11A will be described.

(1) Time $T_{1a}$

As the element X is inoperable at the time $T_{1a}$, the operator determines that "condition A" is applied and therefore takes "action A1" and "action A2". In the case of taking action, the support device 13 receives instruction for selecting appropriate action 92 (herein, "action A1" and "action A2") of the ordained article by checking the program selection check box 94 displayed on the operational safety program selection window 90 and then receives instruction for pushing down the execute button 96. The way of selecting appropriate action 92 described hereinafter is same way as the way of selecting appropriate action 92 described above.

(2) Time $T_{2a}$

In case where the "action A1" will have not finished in the time $T_{2a}$ which is a time after 1 hour from the time $T_{1a}$, since the action required to complete within AOT will not be able to complete by the time $T_{2a}$, the operator changes condition from "condition A" into "condition D". While the operator takes the "action A1" and the "action A2", the operator also takes the "action D1" and the "action D2" in parallel.

In case of changing action, after the support device 13 receives instruction for selecting the action 92 changed by checking the program selection check box 94 displayed on the operational safety program selection window 90 (FIG. 7), the support device 13 receives instruction for pushing down the change button 97. The support device 13 changes the action 92 which has already determined in the action determination step S8, and again determines new action to be taken. The way described later about changing action to be taken is similar to the way described above about changing action to be taken.

(3) Time $T_{3a}$

In case where the "action A1" has finished at the time $T_{3a}$ which is a time when the "action D1" and the "action D2" is being taken, the operator stops taking the "actions D1 and D2" according to the "condition D" and then changes the action from the "actions D1 and D2" according to the "condition D" into the "action A2" according to the "condition A". However, the case where the operator changes into the "action A2" according to the "condition A" is limited to a case where the "action A1" has finished within AOT of the "action A2".

(4-1) In case where the "action A2" has finished within AOT (Time $T_{4a}$)

At the time when the "action A2" has finished, the operator considers as completion of determination that LCO is satisfied. At the time when the determination that LCO is satisfied has completed, the support device 13 receives notice of completion of the recovery work by pushing down the end button 98 displayed on the operational safety program selection window 90 (FIG. 7). The way described later about completion of recovery work is similar to the way described above about completion of recovery work.

(4-2) Time $T_{4a}$

In case where the "action A2" has not finished within AOT of the "action A2", in the time $T_{4a}$ which is a time after 3 days from the time $T_{1a}$, the operator again changes the condition from the "condition A" into the "condition D". In case where the condition is changed, a counting AOT of the "actions D1 and D2" is started from the time $T_{4a}$.

Next, in time when one element (element X) illustrated in FIG. 11B is recovered, a case where another element (element Y) becomes an operation impossibility will be described.

(1) Time $T_{1b}$

As the element X is inoperable at the time $T_{1b}$, the operator determines that "condition A" is applied and therefore takes "Action A1" and "Action A2".

(2) Time $T_{2b}$

At the time $T_{2b}$ within 1 hour from the time $T_{1b}$, the "action A2" has finished within AOT. The operator continues to take the "action A2" so that the "condition A" is satisfied.

(3) Time $T_{3b}$

If the element Y becomes inoperable at the time $T_{3b}$ which is a time when the "action A2" is being taken now, since both the element X and the element Y become inoperable, the operator determines that "condition C" is applied and therefore changes the action which is being taken into the "action C1" and the "action C2". The operator also takes the "action A2", "action B1" and "action B2" in parallel.

(4) Time $T_{4b}$

In the time $T_{4b}$ which is a time within 3 days from the time $T_{1b}$, the "action A1" has finished. With completion of the "action A1", since the "action C1" also has finished, an inoperable element only becomes the element Y. The operator changes the condition into the "condition B" and sequentially takes the "action B1" or the "action B2".

(5) Time $T_{5b}$

In case where the "action B1" or the "action B2" has finished at the time $T_{5b}$ which is a time within 8 hours from the time $T_{3b}$, the operator considers as completion of determination that LCO is satisfied has completed. Namely, the count start point of AOT according to "condition B" is the time $T_{3b}$ which is the time when it is determined that the element Y is inoperable.

Finally, in an application pattern (B) illustrated in FIG. 11C, a case where AOT of the "condition A" has finished before AOT of the "condition C" has finished, will be described.

(1) Time $T_{1c}$

As the element X is inoperable at the time $T_{1c}$, the operator determines that "condition A" is applied and therefore takes "action A1" and "action A2".

(2) Time $T_{2c}$

In the time $T_{2c}$ which is a time within 1 hour from the time $T_{1c}$, the "action A1" has finished within AOT. Since the "condition A" is satisfied, the operator continues to take the "action A2".

(3) Time $T_{3c}$

If the element Y becomes inoperable at the time $T_{3c}$ which is a time when the "action A2" is being taken now, since both the element X and the element Y become inoperable, the operator determines that "condition C" is applied and therefore changes the action which is being taken into the "action C1" and the "action C2". The operator also takes the "action A2", "action B1" and "action B2" in parallel. However, in case of coming the time $T_{4c}$ which is AOT of the "action A2" and the time after 3 days from the $T_{1c}$ before AOT completion time of the "action C2", AOT of the "action A2" is prior to AOT of the "action C2" (For example, the time $T_{3c}$ is the time after 2 days and 23.5 hours from the time $T_{1c}$).

(4-1) The "action A2" has finished within AOT (the time $T_{4c}$)

In case where the "action A2" has finished within AOT (the time $T_{4c}$) of the "condition A", the inoperable element only becomes the element Y. Thus, the operator changes the condition from the "condition C" into the "condition B" and sequentially takes the "action B1" or the "action B2".

(4-2) Time $T_{4c}$

In case where the "action A2" has not finished by the time $T_{4c}$ being a time after 3 days from the time $T_{1c}$ when it is determined that the element X is inoperable, it is determined that the "action A2" has not finished within AOT (The time $T_{4c}$). Thereby, the operator changes the condition into the "condition D" and takes the "action D1" and the "action D2".

According to the operation management support apparatus 1 in the embodiment, when the alarm is output in the nuclear power plant 2, can properly, briefly and specifically provide the operator with the plant data which are estimated by the operation management support apparatus 1, as necessary data for checking current situation and the article of the operational safety program with which the alarm output may conflict. Further, the operation management support apparatus 1 can perform provision of necessary information, presentation of action to be taken (or now being taken), time management until recovery completion and the like in accordance with the situation of the nuclear power plant 2.

The operation management support apparatus 1 as described can reduce the work quantity, the work time or recovery work burden, so that the operator can obtain necessary and sufficient information. The operation management support apparatus 1 allows the operator to accurately accomplish required action (countermeasure) and thereby possible to reduce the risk against the operational safety program, caused by human error.

Further, the plant data list display window 60 (FIG. 4) is provided with the search function. Thereby, the operation management support apparatus 1 allows the operator to also select the plant data which are not listed in the plant data list display window 60 in case where the operator checks the situation of the nuclear power plant 2. Thereby, the operator can arbitrarily also refer to the plant data which are not listed by the operation management support apparatus 1. In the operation management support apparatus 1, since multidirectional situation analysis can be achieved by the operator, the accuracy regarding confirmation of non-compliant portion or non-compliant contents can be increased.

Furthermore, the operational safety program selection window 90 (FIG. 7) is provided with the search function. Thereby, the operation management support apparatus 1 allows the operator to also select ordained article which is not listed in the operational safety program selection window 90 in case where the operator selects the article which conflicts with the operational safety program. Thereby, the operator can arbitrarily also refer to ordained article which is not listed by the operation management support apparatus 1. The operation management support apparatus 1, for the operator, can reduce the risk of erroneously selecting which is caused by determining in limiting range.

It is noted that the present invention is not limited to the above-described embodiments as they are and, in an implementation phase, can be embodied in various forms other than the specific embodiments described above. Various omissions, substitutions, and changes may be made without departing from the spirit and scope of the invention. These embodiments and modifications thereof are included within the sprit and scope of the invention and are included within the scope of the invention as disclosed in the claims and equivalents thereof.

REFERENCE NUMERALS

1 - - - operation management support apparatus
2 - - - nuclear power plant
3a-3x - - - sensor 11 - - - plant data database (DB)
12 - - - alarm device
13 - - - support device
14 - - - operational safety program database (DB)
15 - - - large display device
16 - - - individual display device
17 - - - input device
18 - - - printer
21 - - - plant data input/output (I/O) unit
22 - - - plant data storage portion
23 - - - operational safety program storage portion
24 - - - maintenance work history storage
25 - - - alarm information storage
41 - - - plant data list extraction unit
42 - - - plant data extraction unit
45 - - - operational safety program extraction unit
46 - - - countermeasure extraction unit
47 - - - timer unit
49 - - - alarm information extraction unit
50 - - - maintenance history management unit
51 - - - image processing unit
52 - - - window form storage

The invention claimed is:

1. An operation management support apparatus for a power plant comprising:
    an alarm device that compares a plant data measured by a sensor installed in a power plant with a preset alarm value, and generates an alarm output instruction signal for instructing an alarm to be output in a case of determining whether the power plant is abnormal;
    an operational safety program storage that stores an information in relation to an operational safety program of the power plant, the information including a limiting condition for operation, a condition to which the operational safety program is applied, at least one required action, and an allowed outage time, in each of articles of the extracted operational safety program;
    an operational safety program extraction device that associates an event that causes the alarm output with an article of the operational safety program, and extracts an information in relation to the operational safety program against the event which causes the alarm output from the information stored in the operational safety program storage on the basis of the plant data in relation to the alarm output in a case of receiving the alarm output instruction signal;
    a display device that displays the plant data and the condition, the at least one required action, and the allowed outage time, in each article of the extracted operational safety program, included in the extracted information;
    a selection device that receives an instruction for selecting at least one required action selected by a user from the at least one required action displayed on the display device, and an instruction for changing the at least one required action selected by the user into a new at least one required action selected by the user if a necessity of changing the at least one required action is caused by finishing a required action of the at least one required action;
    a timer device that starts a time in a case of receiving the instruction for selecting the at least one required action or changing the at least one required action, in accordance with the allowed outage time information included in the extracted information; and
    a countermeasure extraction device configured to extract the at least one required action and each allowed outage time of the at least one required action, and to extract the new at least one required action and each allowed outage time of the new at least one required action if the selection device receives the changing instruction,
    wherein the operational safety program extraction device is configured to extract the at least one required action and each allowed outage time of the at least one required action, and to extract the new at least one required action and each allowed outage time of the new at least one required action if the selection device receives the changing instruction, and
    wherein the display device is configured to display a time timed by the timer device, the at least one required action, and each allowed outage time of the at least one required action, and to display the new at least one required action and each allowed outage time of the new at least one required action if the selection device receives the changing instruction.

2. The operation management support apparatus for power plant according to claim 1, further comprising an input device that receives an instruction for displaying any one of the plant data and the operational safety program.

3. The operation management support apparatus for power plant according to claim 2, wherein the displayed information further includes the limiting condition for operation in each article of the operational safety program displayed on the display device.

4. The operation management support apparatus for power plant according to claim 1, further comprising a maintenance work history storage that stores contents of a maintenance work occurred during a time from an alarm output to completion of recovering from the abnormal state and a time of occurrence of the maintenance work.

5. The operation management support apparatus for power plant according to claim 1, further comprising a plant data extraction device that extracts plant data in accordance with a search condition which is input and includes any one of a tag number, a plant data name, a system and a free word, and transmits the plant data in accordance with the search condition to the display device.

6. The operation management support apparatus for power plant according to claim 1, further comprising an operational safety program search device that extracts the operational safety program in accordance with a search condition which includes any one of a tag number, a plant device name, a system, a device type, and a free word, and transmits the operational safety program in accordance with the search condition to the display device.

* * * * *